United States Patent [19]
Inoshita

[11] Patent Number: 6,069,809
[45] Date of Patent: May 30, 2000

[54] RESONANT INVERTER APPARATUS

[75] Inventor: Ryosuke Inoshita, Kasugai, Japan

[73] Assignee: Denso Corporation, Kariya, Japan

[21] Appl. No.: 09/305,103

[22] Filed: May 4, 1999

[30] Foreign Application Priority Data

May 8, 1998 [JP] Japan ................................. 10-126296

[51] Int. Cl.[7] .......................... H02M 3/24; H02M 7/5387
[52] U.S. Cl. ............................................. 363/98; 363/132
[58] Field of Search ................................. 363/16, 17, 97, 363/98, 131, 132

[56] References Cited

U.S. PATENT DOCUMENTS

| | | | |
|---|---|---|---|
| 4,612,596 | 9/1986 | Fox .......................................... | 361/146 |
| 4,730,242 | 3/1988 | Divan ....................................... | 363/37 |
| 4,833,584 | 5/1989 | Divan ....................................... | 363/37 |
| 5,047,913 | 9/1991 | De Doncker et al. .................... | 363/95 |
| 5,172,309 | 12/1992 | De Doncker et al. .................. | 363/132 |
| 5,469,028 | 11/1995 | Nilssen .................................... | 315/291 |
| 5,592,371 | 1/1997 | Rajashekara et al. .................... | 363/98 |
| 5,594,634 | 1/1997 | Rajashekara et al. .................... | 363/98 |
| 5,717,584 | 2/1998 | Rajashekara et al. .................... | 363/98 |
| 5,841,644 | 11/1998 | Lipo et al. ................................ | 363/37 |
| 5,892,673 | 4/1999 | Delgado et al. .......................... | 363/98 |

OTHER PUBLICATIONS

"Resonant Snubbers with Auxiliary Switches" by William McMurray; Dec. 1989 IEEE: pp. 829–834.

"The Auxiliary Resonant Commutated Pole Converter" by R.W. De doncker et al; May 1990 IEEE; pp. 1228–1235.

*Primary Examiner*—Matthew Nguyen
*Attorney, Agent, or Firm*—Pillsbury Madison & Sutro LLP

[57] ABSTRACT

An inverter portion (2) includes upper main switches and lower main switches of different phases, main switching devices (3a–3f) provided in the upper main switches and the lower main switches respectively, and diodes (4a–4f) connected in antiparallel with the main switching devices (3a–3f) respectively. Bus-splitting portions (1D, 1E, 1F, 6, 7) are connected to each other at a bus-splitting junction. A resonant circuit portion (8) includes resonant reactors (9a–9c), auxiliary switches (11a–11c), and resonant capacitors (10a–10c). The resonant reactors (9a–9c) and the auxiliary switches (11a–11c) are connected in series circuits. The series circuits are connected between the bus-splitting junction and the junctions between series-coupled main switches. The resonant capacitors (10a–10c) are connected in parallel with the series circuits respectively. A gate drive portion (12) operates for turning on an auxiliary switch, which is in the series circuit connected to the junction between the series-coupled main switches of a phase to be switched, among the auxiliary switches (11a–11c). The gate drive portion (12) operates for enabling main switching devices, which are of the phase to be switched, among the main switching devices (3a–3f) to implement zero-voltage switching. The gate drive portion (12) operates for turning off the auxiliary switch in the series circuit connected to the junction between the series-coupled main switches of the phase to be switched when a current flowing through the related resonant reactor becomes substantially zero.

27 Claims, 7 Drawing Sheets

RESONANT INVERTER APPARATUS

BACKGROUND OF THE INVENTION

1. Field of the Invention

This invention relates to a resonant inverter apparatus or a resonant power converter for changing DC power into AC power, and feeding the AC power to an AC-powered load to drive the latter. Examples of the AC-powered load are an AC motor and an AC rotating machine.

2. Description of the Related Art

In general, an inverter apparatus or a power converter is provided between a DC power supply and an AC-powered load. The inverter apparatus receives DC power from the DC power supply. The inverter apparatus changes the DC power into AC power. The inverter apparatus feeds the AC power to the AC-powered load, and thereby drives the AC-powered load.

There is a power converter of an all resonant type in which resonance is always implemented by a resonant circuit. Since resonance is always implemented, such a power converter tends to encounter the problem of a great conduction loss caused in a reactor for resonance.

A power converter of a quasi resonant type solves the above-indicated problem in the power converter of the all resonant type. In the power converter of the partial resonant type, resonance is implemented only at switching moments.

U.S. Pat. No. 5,047,913 discloses a power converter of the quasi resonant type. The power converter in U.S. Pat. No. 5,047,913 has a large number of parts, and thus tends to be complicated in structure.

SUMMARY OF THE INVENTION

It is an object of this invention to provide a resonant inverter apparatus having a reduced size and a reduced number of resonant capacitors.

A first aspect of this invention provides a resonant inverter apparatus comprising a DC voltage source (1) for generating a DC voltage; an inverter portion (2) connected to the positive and negative rails of the DC voltage source (1), the inverter portion (2) including upper main switches and lower main switches being series-coupled in each phase, main switching devices (3a–3f) provided in the upper and lower main switches respectively, and flywheel diodes (4a–4f) connected in antiparallel with the main switching devices (3a–3f) respectively; bus-splitting means means (1D, 1E, 6, 7) connected to the positive and negative rails of the DC voltage source (1), or a variable DC source (1F) connected to the negative rail of the DC voltage source (1); a resonant circuit portion (8) connected to the junction of a pair of series-coupled bus splitting means (1D, 1E, 6, 7) or the other terminal of a variable DC source (1F) and the inverter portion (2), the resonant circuit portion (8) including resonant reactors (9a–9c), auxiliary switches (11a–11c), and resonant capacitors (10a–10c), the resonant reactors (9a–9c) and the auxiliary switches (11a–11c) being connected in series circuits, the series circuits being connected between the junction of a pair of series-coupled bus splitting means (1D, 1E, 6, 7) and the junctions of the respective phases in the inverter portion (2), the resonant capacitors (10a–10c) being connected in parallel with the series circuits respectively; current detection means (14) for detecting currents flowing through the resonant reactors (9a–9c); and gate drive means (12) for turning on an auxiliary switch, which is in the series circuit connected to the junction between series-coupled main switches of a phase to be switched, among the auxiliary switches (11a–11c) to cause resonance by the related resonant reactor and the related resonant capacitor, for enabling main switching devices, which are of the phase to be switched, among the main switching devices (3a–3f) to implement zero-voltage switching, and for turning off the auxiliary switch in the series circuit connected to the junction between series-coupled main switches of the phase to be switched when the current flowing through the related resonant reactor which is detected by the current detection means (14) becomes substantially zero.

A second aspect of this invention is based on the first aspect thereof, and provides a resonant inverter apparatus wherein the gate drive means (12) comprises a gate signal generation circuit (13) for generating and outputting a signal representative of a pattern for controlling the main switching devices (3a–3f), a zero voltage detection circuit (15) for detecting that voltages across the main switching devices (3a–3f) become substantially zero, and outputting a signal representative thereof, a control circuit (16) generating and outputting a signal representative of a switching pattern for the main switching devices (3a–3f) and the auxiliary switches (11a–11c) in response to the signals outputted from the gate signal generation circuit (13) and the zero voltage detection circuit (15) and an output signal of the current detection means (14), and a drive circuit (17) for driving the main switching devices (3a–3f) and the auxiliary switches (11a–11c) in response to the signal outputted from the control circuit (16).

A third aspect of this invention is based on the first aspect thereof, and provides a resonant inverter apparatus wherein the bus-splitting means (1D, 1E, 1F, 6, 7) comprise a series combination of capacitors (6, 7).

A fourth aspect of this invention is based on the first aspect thereof, and provides a resonant inverter apparatus wherein the bus-splitting means (1D, 1E, 1F, 6, 7) comprise a series combination of DC power sources (1D, 1E).

A fifth aspect of this invention is based on the first aspect thereof, and provides a resonant inverter apparatus wherein each of the auxiliary switches (11a–11c) includes a series combination of reverse conducting type switches or a parallel combination of reverse blocking type switches.

A sixth aspect of this invention is based on the first aspect thereof, and provides a resonant inverter apparatus wherein each of the auxiliary switches (11a–11c) is of a self-commutated type.

A seventh aspect of this invention is based on the first aspect thereof, and provides a resonant inverter apparatus wherein each of the aux1liary switches (11a–11c) includes one of a junction field-effect transistor, a metal oxide semiconductor field-effect transistor, an insulated gate bipolar transistor, an injection enhanced insulation gate bipolar transistor, a static induction transistor, a gate turn-off thyristor, and a MOS controlled thyristor.

An eighth aspect of this invention is based on the first aspect thereof, and provides a resonant inverter apparatus wherein the gate drive means (12) includes means for turning off the main switching device of the phase to be switched when the related auxiliary switch is in its on state and the current flowing through the related resonant reactor which is detected by the current detection means (14) reaches a reference current level.

A ninth aspect of this invention is based on the first aspect thereof, and provides a resonant inverter apparatus wherein the reference current level varies as a function of a load current fed from the inverter portion (2) to a load (5).

A tenth aspect of this invention is based on the first aspect thereof, and provides a resonant inverter apparatus wherein the gate drive means means (12) includes means for turning on the main switching device of the phase to be switched during a time interval for which the related flywheel diode connected in antiparallel with the main switching devices (3a–3f) is in its conductive state.

An eleventh aspect of this invention is based on the first aspect thereof, and provides a resonant inverter apparatus wherein the detection means (14) includes Hall-effect current sensors for detecting the currents flowing through the resonant reactors (9a–9c).

A twelfth aspect of this invention is based on the first aspect thereof, and provides a resonant inverter apparatus wherein the detection means (14) includes current sensors incorporated in the auxiliary switches (11a–11c) for detecting the currents flowing through the resonant reactors (9a–9c).

A thirteenth aspect of this invention provides a resonant inverter apparatus wherein a bus-splitting means (1D, 1E, 1F, 6, 7) comprises a DC power source (1F) for generating a variable DC voltage.

A fourteenth aspect of this invention is based on the first aspect thereof, and provides a resonant inverter apparatus wherein the resonant capacitor of the phase to be switched operate as a snubber for the main switching device in the related upper and lower main switches when the main switching device is turned off.

DESCRIPTION OF THE PREFERRED EMBODIMENTS

A prior-art resonant power converter will be explained below for a better understanding of this invention.

Figure 1:
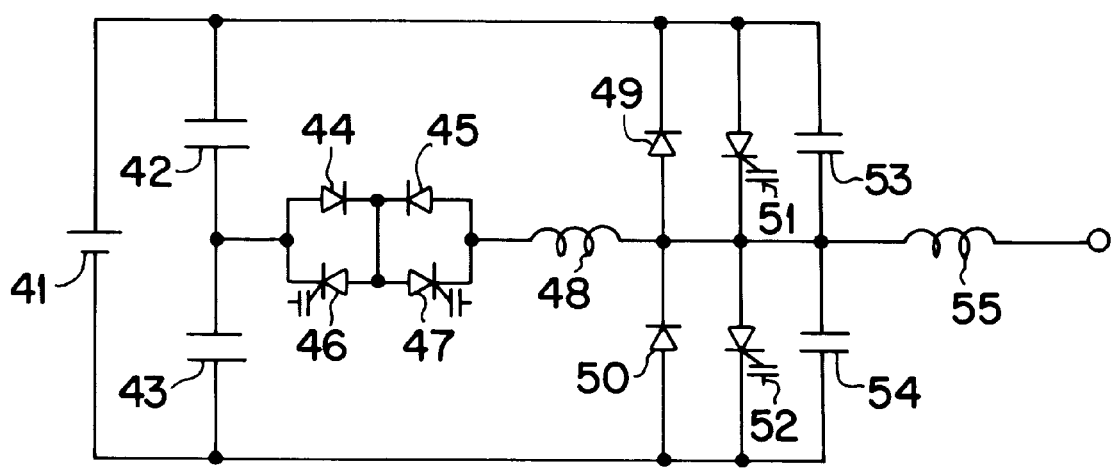
FIG. 1 is a schematic diagram of a prior-art resonant power converter.

FIG. 1 shows a 1-phase-corresponding portion of a prior-art three-phase resonant power converter disclosed in U.S. Pat. No. 5,047,913. The prior-art power converter in FIG. 1 includes a first circuit having a series combination of voltage dividing capacitors 42 and 43, a second circuit having a series combination of flywheel diodes 49 and 50, a third circuit having a series combination of main switching devices 51 and 52, and a fourth circuit having a series combination of resonant capacitors (snubber capacitors) 53 and 54. The first, second, third, and fourth circuits are connected in parallel with a DC voltage source 41. A load inductor 55 is coupled to the junction between the snubber capacitors 53 and 54.

In addition, the prior-art power converter of FIG. 1 includes an auxiliary resonant commutation circuit having a combination of auxiliary switching devices 46 and 47, flywheel diodes 44 and 45, and a resonant reactor (a resonant inductor) 48. One end of the auxiliary resonant commutation circuit is connected to the junction between the voltage dividing capacitors 42 and 43. The other end of the auxiliary resonant commutation circuit is connected to the junction between the flywheel diodes 49 and 50, the junction between the main switching devices 51 and 52, and the junction between the resonant capacitors 53 and 54.

The prior-art power converter of FIG. 1 operates as follows. In the case where the main switching device 51 is required to change from its on state to its off state, the auxiliary switching device 46 is turned on when substantially zero current flows therethrough. The switching of the main switching device 51 is executed when the voltage thereacross reaches substantially zero. Accordingly, there is substantially no turn-off switching loss caused by the main switching device 51. When the main switching device 51 is in its off state, resonance is caused by the resonant inductor 48 and the resonant capacitors 53 and 54.

In the case where the main switching device 52 is required to change from its on state to its off state, the auxiliary switching device 47 is turned on when substantially zero current flows therethrough. The switching of the main switching device 52 is executed when the voltage thereacross reaches substantially zero. Accordingly, there is substantially no turn-off switching loss caused by the main switching device 52. When the main switching device 52 is in its off state, resonance is caused by the resonant inductor 48 and the resonant capacitors 53 and 54.

The prior-art power converter has three 1-phase-corresponding portions similar to each other. The DC voltage source 41 and the voltage dividing capacitors 42 and 43 are common to the three 1-phase-corresponding portions. Thus, the whole of the prior-art power converter has two voltage dividing capacitors, three reactors, six resonant capacitors, six main switching devices, six auxiliary switching devices, and twelve flywheel diodes. Accordingly, the prior-art power converter is composed of many parts. In addition, the prior-art power converter has a complicated structure.

First Embodiment

Figure 2:
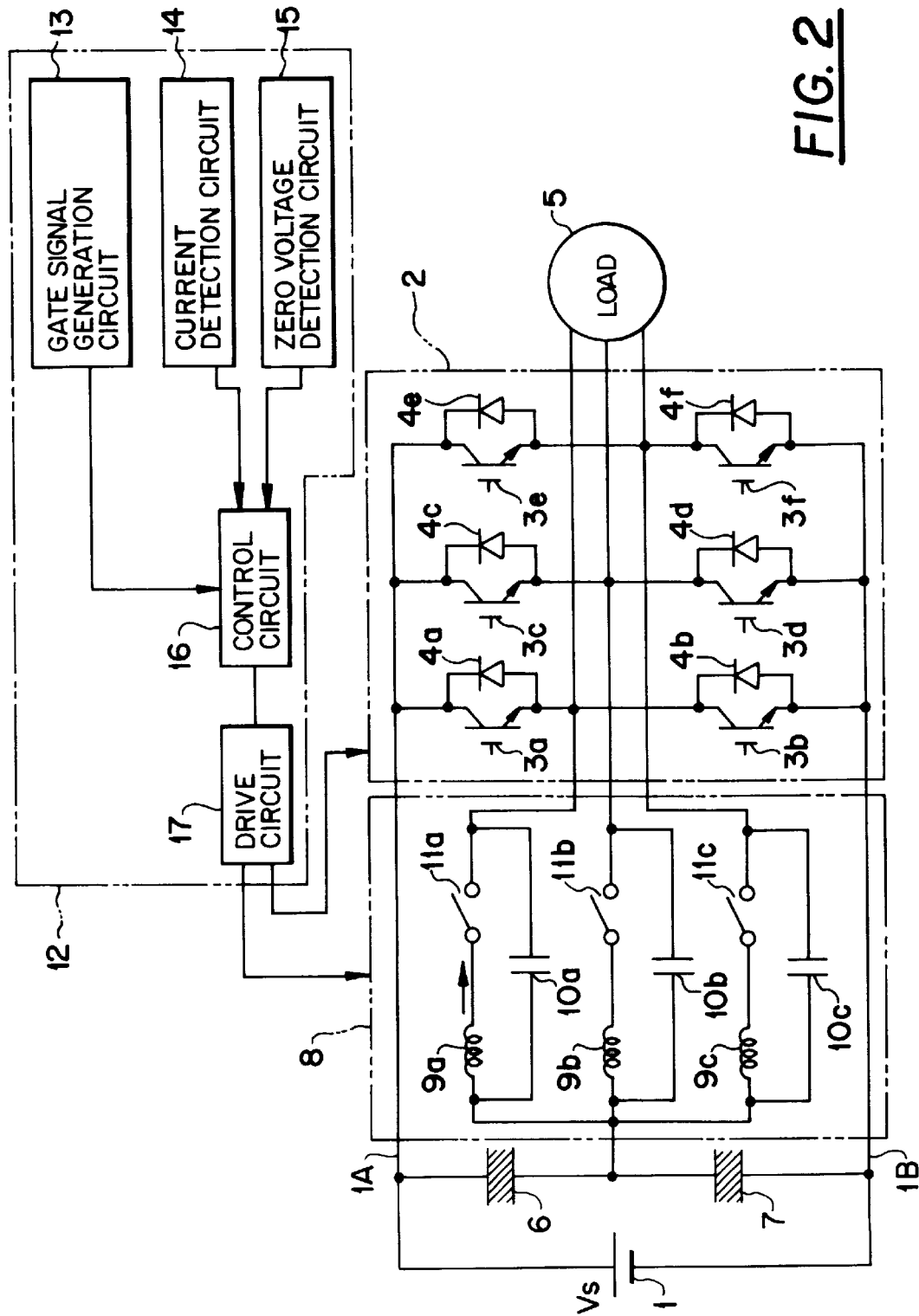
FIG. 2 is a diagram of a resonant inverter apparatus according to a first embodiment of this invention.

FIG. 2 shows a resonant inverter apparatus according to a first embodiment of this invention. With reference to FIG. 2, the resonant inverter apparatus is connected between a DC power source (a DC voltage source) 1 and a three-phase AC-powered load 5. Here, "DC" is short for "direct current", and "AC" is short for "alternating current". An example of the load 5 is a general three-phase AC motor, a three-phase synchronous AC motor, or a three-phase AC rotating machine. The resonant inverter apparatus receives DC power from the DC power source 1, and converts the received DC power into AC power and feeds the AC power to the load 5 to drive the load 5.

The DC power source 1 generates a DC voltage Vs. The resonant inverter apparatus changes the DC voltage Vs into an AC voltage applied to the load 5.

With reference to FIG. 2, the resonant inverter apparatus includes an inverter portion (a power converting portion 2) having main switching devices 3a, 3b, 3c, 3d, 3e, and 3f. Preferably, the main switching devices 3a–3f are of a self-commutated type. Each of the main switching devices 3a–3f includes, for example, a transistor having a base (a control terminal or a gate), an emitter, and a collector. The main switching devices 3a–3f are connected to form a bridge circuit. The bridge circuit is connected between a positive rail 1A and a negative rail 1B which lead from the positive terminal and the negative terminal of the DC power source 1 respectively. The bridge circuit has three portions corresponding to three phases respectively. The three phases are also referred to as the U phase, the V phase, and the W phase. The first portion of the bridge circuit includes the main switching devices 3a and 3b which are connected in series. The main switching devices 3a and 3b relate to the U phase. The series combination of the main switching devices 3a and 3b is connected between the positive rail 1A and the negative rail 1B. The second portion of the bridge circuit includes the main switching devices 3c and 3d which are connected in series. The main switching devices 3c and 3d relate to the V phase. The series combination of the main switching devices 3c and 3d is connected between the positive rail 1A and the negative rail 1B. The third portion of the bridge circuit includes the main switching devices 3e and 3f which are connected in series. The main switching devices 3e and 3f relate to the W phase. The series combination of the main switching devices 3e and 3f is connected between the positive rail 1A and the negative rail 1B.

The inverter portion (the power converting portion) 2 includes flywheel diodes 4a, 4b, 4c, 4d, 4e, and 4f which are connected in antiparallel with the main switching devices 3a, 3b, 3c, 3d, 3e, and 3f respectively. The combination of the main switching device 3a and the flywheel diode 4a forms a bridge arm connected to the positive rail 1A. The combination of the main switching device 3b and the flywheel diode 4b forms a bridge arm connected to the negative rail 1B. The combination of the main switching device 3c and the flywheel diode 4c forms a bridge arm connected to the positive rail 1A. The combination of the main switching device 3d and the flywheel diode 4d forms a bridge arm connected to the negative rail 1B. The combination of the main switching device 3e and the flywheel diode 4e forms a bridge arm connected to the positive rail 1A. The combination of the main switching device 3f and the flywheel diode 4f forms a bridge arm connected to the negative rail 1B. The bridge arms connected to the positive rail 1A are referred to as the upper bridge arms or the upper arms. The bridge arms connected to the negative rail 1B are referred to as the lower bridge arms or the lower arms.

The inverter portion (the power converting portion) 2 is connected to a gate drive portion (a control portion) 12. The inverter portion 2 is controlled by the gate drive portion 12. Specifically, the pair of the main switching devices 3a and 3b, the pair of the main switching devices 3c and 3d, and the pair of the main switching devices 3e and 3f are subjected by the gate drive portion 12 to respective on/off control processes (switching processes) having 120° phase differences relative to each other. Thus, the gate drive portion 12 switches the main switching devices 3a–3f in accordance with a predetermined switching pattern to enable the inverter portion 2 to implement desired power conversion.

The inverter portion (the power converting portion) 2 is connected to the load 5. Specifically, the junction between the main switching devices 3a and 3b in the inverter portion 2 is connected to a first terminal of the load 5 which corresponds to the U phase. The junction between the main switching devices 3c and 3d in the inverter portion 2 is connected to a second terminal of the load 5 which corresponds to the V phase. The junction between the main switching devices 3e and 3f in the inverter portion 2 is connected to a third terminal of the load 5 which corresponds to the W phase. The inverter portion 2 generates a three-phase AC voltage, and applies the generated three-phase AC voltage to the first, second, and third terminals of the load 5.

A series combination of voltage dividing capacitors 6 and 7 is connected between the positive rail 1A and the negative rail 1B. Specifically, a first end of the capacitor 6 is connected to the positive rail 1A. A second end of the capacitor 6 is connected to a first end of the capacitor 7. A second end of the capacitor 7 is connected to the negative rail 1B. The capacitors 6 and 7 compose a device for dividing the DC voltage Vs across the DC power source 1. Generally, a voltage equal to a half of the DC voltage Vs appears at the junction between the capacitors 6 and 7.

A resonant circuit portion 8 is connected between the inverter portion 2 and the combination of the voltage dividing capacitors 6 and 7. The resonant circuit portion 8 implements resonance upon switching operation of the main switching devices 3a–3f in the inverter portion 2.

The resonant circuit portion 8 includes a resonant reactor (a resonant inductor) 9a, a resonant capacitor 10a, and an auxiliary switch 11a for the U phase. The resonant reactor 9a and the auxiliary switch 11a are connected in series. A first end of the series combination of the resonant reactor 9a and the auxiliary switch 11a is connected to the junction between the voltage dividing capacitors 6 and 7. A second end of the series combination of the resonant reactor 9a and the auxiliary switch 11a is connected to the junction between the main switching devices 3a and 3b in the inverter portion 2. The resonant capacitor 10a, is connected across the series combination of the resonant reactor 9a and the auxiliary switch 11a.

The resonant circuit portion 8 includes a resonant reactor (a resonant inductor) 9b, a resonant capacitor 10b, and an auxiliary switch 11b for the V phase. The resonant reactor 9b and the auxiliary switch 11b are connected in series. A first end of the series combination of the resonant reactor 9b and the auxiliary switch 11b is connected to the junction between the voltage dividing capacitors 6 and 7. A second end of the series combination of the resonant reactor 9b and the auxiliary switch 11b is connected to the junction between the main switching devices 3c and 3d in the inverter portion 2. The resonant capacitor 10b is connected across the series combination of the resonant reactor 9b and the auxiliary switch 11b.

The resonant circuit portion 8 includes a resonant reactor (a resonant inductor) 9c, a resonant capacitor 10c, and an auxiliary switch 11c for the W phase. The resonant reactor 9c and the auxiliary switch 11c are connected in series. A first end of the series combination of the resonant reactor 9c and the auxiliary switch 11c is connected to the junction between the voltage dividing capacitors 6 and 7. A second end of the series combination of the resonant reactor 9c and the auxiliary switch 11c is connected to the junction between the main switching devices 3e and 3f in the inverter portion 2. The resonant capacitor 10c is connected across the series combination of the resonant reactor 9c and the auxiliary switch 11c.

The resonant circuit portion 8 is connected to the gate drive portion 12. The resonant circuit portion 8 is controlled by the gate drive portion 12. Specifically, the auxiliary switches 11a, 11b, and 11c are subjected by the gate drive portion 12 to respective on/off control processes (switching processes) having 120° phase differences relative to each other. Thus, the gate drive portion 12 switches the auxiliary switches 11a, 11b, and 11c in accordance with a predetermined switching pattern to enable the resonant circuit portion 8 to implement desired resonance processes.

As previously indicated, the gate drive portion 12 operates to control the main switching devices 3a–3f in the inverter portion 2 and the auxiliary switches 11a–11c in the resonant circuit portion 8. The gate drive portion 12 includes a gate signal generation circuit 13, a current detection circuit 14, a zero voltage detection circuit 15, a control circuit 16, and a drive circuit 17. The gate signal generation circuit 13, the current detection circuit 14, and the zero voltage detection circuit 15 are connected to the control circuit 16. The current detection circuit 14 is connected to the resonant circuit portion 8 although the connection is not shown in FIG. 2. The zero voltage detection circuit 15 is connected to the inverter portion 2 although the connection is not shown in FIG. 2. The control circuit 16 is connected to the drive circuit 17. The drive circuit 17 is connected to the control terminals of the main switching devices 3a–3f and the control terminals of the auxiliary switches 11a–11c.

The gate signal generation circuit 13 includes sub circuits corresponding to the U-phase upper bridge arm, the U-phase lower bridge arm, the V-phase upper bridge arm, the V-phase lower bridge arm, the W-phase upper bridge arm, and the W-phase lower bridge arm respectively. The sub circuits output respective PWM (pulse width modulation) signals to the control circuit 16 as basic gate signals for the main switching devices 3a–3f.

In addition, the gate signal generation circuit 13 includes sub circuits corresponding to the U-phase, the V-phase, and the W-phase respectively. The sub circuits output respective PWM (pulse width modulation) signals to the control circuit 16 as basic gate signals for the auxiliary switches 11a–11c.

The current detection circuit 14 includes sub circuits or sensors for detecting currents through the resonant reactors 9a, 9b, and 9c in the resonant circuit portion 8, respectively. The sub circuits (the sensors) output signals to the control circuit 16 which represent the detected currents through the resonant reactors 9a, 9b, and 9c respectively.

The current detection circuit 14 may include Hall-effect current sensors associated with the resonant reactors 9a, 9b, and 9c respectively. Alternatively, the current detection circuit 14 may include current sensors incorporated in the auxiliary switches 11a, 11b, and 11c respectively.

The zero voltage detection circuit 15 includes sub circuits for detecting whether or not the voltages between the collectors and the emitters of the main switching devices 3a–3f in the inverter portion 2 are substantially equal to zero, respectively. The sub circuits output signals to the control circuit 16 which represent the detection results.

The control circuit 16 generates control signals (main-device control signals) for the respective main switching devices 3a–3f in the inverter portion 2 in response to the PWM signals outputted from the gate signal generation circuit 13, the detection signals outputted from the current detection circuit 14, and the detection signals outputted from the zero voltage detection circuit 15. The control circuit 16 outputs the main-device control signals to the drive circuit 17. In addition, the control circuit 16 generates control signals (auxiliary-device control signals) for the respective auxiliary switches 11a–11c in the resonant circuit portion 8 in response to the PWM signals outputted from the gate signal generation circuit 13, the detection signals outputted from the current detection circuit 14, and the detection signals outputted from the zero voltage detection circuit 15. The control circuit 16 outputs the auxiliary-device control signals to the drive circuit 17.

The drive circuit 17 turns on and off the main switching devices 3a–3f in the inverter portion 2 in response to the respective main-device control signals fed from the control circuit 16. In addition, the drive circuit 17 turns on and off the auxiliary switches 11a–11c in the resonant circuit portion 8 in response to the respective auxiliary-device control signals fed from the control circuit 16.

Preferably, the drive circuit 17 converts the output signals (the main-device control signals and the auxiliary-device control signals) of the control circuit 16 into suitable voltages for driving the main switching devices 3a–3f and the auxiliary switches 11a–11c.

Figure 3:
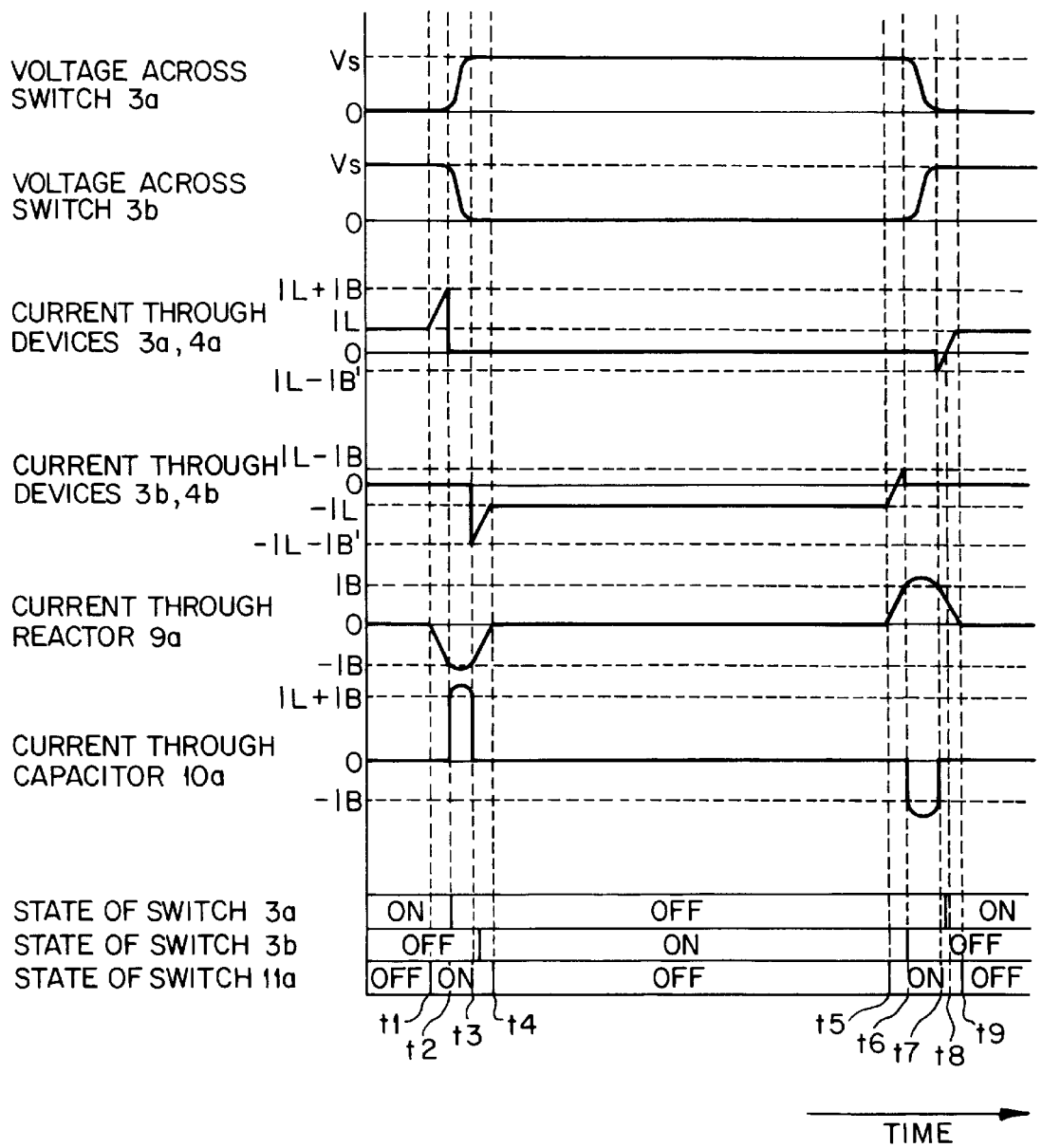
FIG. 3 is a time-domain diagram of currents, voltages, states of main switching devices, and a state of an auxiliary switch in the resonant inverter apparatus in FIG. 2.

Regarding commutations in the U phase, the resonant inverter apparatus operates as follows. With reference to FIG. 3, before a moment t1, the main switching device 3a is in its on state and the main switching device 3b is in its off state, and a load current IL flows into the load 5 via the main switching device 3a. In addition, the auxiliary switch 11a is in its off state. At the moment t1, the control circuit 16 outputs an auxiliary-device turn-on signal to the drive circuit 17 in response to the related PWM signal from the gate signal generation circuit 13 so that the drive circuit 17 changes the auxiliary switch 11a to its on state. At the moment t1, since the resonant reactor 9a operates to block a current through the auxiliary switch 11a, the auxiliary switch 11a implements zerocurrent switching.

After the moment t1, the current through the resonant reactor 9a varies from zero. The control circuit 16 is informed of the current through the resonant reactor 9a by the current detection circuit 14. At a moment t2 following the moment t1, the current through the resonant reactor 9a reaches a predetermined negative reference current level (a specified negative boost current level) –IB. When the control circuit 16 detects that the current through the resonant reactor 9a reaches the reference current level –IB, the control circuit 16 outputs a main-device turn-off signal to the drive circuit 17 so that the drive circuit 17 changes the main switching device 3a to its off state. Accordingly, at the moment t2, the main switching device 3a is turned off. Upon the change of the main switching device 3a to its off state, the resonant capacitor 10a (or the combination of the resonant capacitor 10a, and the voltage dividing capacitor 6) operates as a snubber for suppressing a change in the voltage between the collector and the emitter of the main switching device 3a. Thus, at the moment t2, the main switching device 3a implements zero-voltage switching.

It should be noted that a variable negative current level –IBV may be used instead of the reference current level –IB. The current level –IBV varies in accordance with the load current. For example, the current level –IBV is equal to the load current plus a predetermined current level. In this case, when the current through the resonant reactor 9a reaches the current level –IBV, the control circuit 16 outputs a main-device turn-off signal to the drive circuit 17 so that the drive circuit 17 changes the main switching device 3a to its off state.

Resonance by the resonant reactor 9a and the resonant capacitor 10a, occurs. After the moment t2, a current flows through the resonant capacitor 10a while the voltage between the collector and the emitter of the main switching device 3b drops. At a moment t3 subsequent to the moment t2, the voltage between the collector and the emitter of the main switching device 3b reaches a threshold voltage of the flywheel diode 4b so that the flywheel diode 4b changes to its on state. Thus, a non-zero current starts to flow through the flywheel diode 4b. After the moment t3, the current through the resonant reactor 9a linearly varies toward zero. At a moment t4 following the moment t3, the current through the resonant reactor 9a reaches substantially zero. When the control circuit 16 detects that the current through the resonant reactor 9a reaches substantially zero by referring to the related output signal of the current detection circuit 14, the control circuit 16 outputs an auxiliary-device turn-off signal to the drive circuit 17 so that the drive circuit 17 returns the auxiliary switch 11a to its off state. Accordingly, at the moment t4, the auxiliary switch 11a is turned off. At the moment t4, since the current through the resonant reactor 9a is zero, the auxiliary switch 11a implements zero-current switching.

At a suitable moment between the moments t3 and t4, that is, at a suitable moment within the time interval for which the voltage between the collector and the emitter of the main switching device 3b remains substantially zero (or the flywheel diode 4b remains in its on state), the control circuit 16 outputs a main-device turn-on signal to the drive circuit 17 so that the drive circuit 17 changes the main switching device 3b to its on state. Accordingly, at the suitable moment between the moments t3 and t4, the main switching device 3b is turned on. In this case, the main switching device 3b implements zero-voltage switching.

With reference to FIG. 3, until a moment t5 subsequent to the moment t4, the main switching device 3a is in its off state and the main switching device 3b is in its on state, and a negative load current −IL flows into the load 5 via the main switching device 3b. In addition, the auxiliary switch 11a is in its off state. At the moment t5, the control circuit 16 outputs an auxiliary-device turn-on signal to the drive circuit 17 in response to the related PWM signal from the gate signal generation circuit 13 so that the drive circuit 17 changes the auxiliary switch 11a to its on state. When the auxiliary switch 11a is turned on, the current through the auxiliary switch 11a does not varies stepwise from zero. Accordingly, at the moment t5, the auxiliary switch 11a implements zero-current switching.

After the moment t5, the current through the resonant reactor 9a increases from zero. At a moment t6 following the moment t5, the current through the resonant reactor 9a reaches a predetermined positive reference current level (a specified positive boost current level) +IB. When the control circuit 16 detects that the current through the resonant reactor 9a reaches the reference current level +IB by referring to the related output signal of the current detection circuit 14, the control circuit 16 outputs a main-device turn-off signal to the drive circuit 17 so that the drive circuit 17 changes the main switching device 3b to its off state. Accordingly, at the moment t6, the main switching device 3b is turned off. Upon the change of the main switching device 3b to its off state, the resonant capacitor 10a (or the combination of the resonant capacitor 10a and the voltage dividing capacitor 7) operates as a snubber for suppressing a change in the voltage between the collector and the emitter of the main switching device 3b. Thus, at the moment t6, the main switching device 3b implements zero-voltage switching.

It should be noted that a variable positive current level +IBV may be used instead of the reference current level +IB. The current level +IBV varies in accordance with the load current. For example, the current level +IBV is equal to the load current plus a predetermined current level. In this case, when the current through the resonant reactor 9a reaches the current level +IBV, the control circuit 16 outputs a main-device turn-off signal to the drive circuit 17 so that the drive circuit 17 changes the main switching device 3b to its off state.

Resonance by the resonant reactor 9a and the resonant capacitor 10a, occurs. After the moment t6, a non-zero current flows through the resonant capacitor 10a while the voltage between the collector and the emitter of the main switching device 3a drops. At a moment t7 subsequent to the moment t6, the voltage between the collector and the emitter of the main switching device 3a reaches a threshold voltage of the flywheel diode 4a so that the flywheel diode 4a changes to its on state. Thus, a non-zero current starts to flow through the flywheel diode 4a. After the moment t7, the current through the resonant reactor 9a linearly decreases toward zero. At a moment t9 following the moment t7, the current through the resonant reactor 9a reaches substantially zero. When the control circuit 16 detects that the current through the resonant reactor 9a reaches substantially zero by referring to the related output signal of the current detection circuit 14, the control circuit 16 outputs an auxiliary-device turn-off signal to the drive circuit 17 so that the drive circuit 17 returns the auxiliary switch I11a to its off state. Accordingly, at the moment t9, the auxiliary switch 11a is turned off. At the moment t9, since the current through the resonant reactor 9a is zero, the auxiliary switch 11a implements zero-current switching.

At a suitable moment between the moments t7 and t9, that is, at a suitable moment within the time interval for which the voltage between the collector and the emitter of the main switching device 3a remains substantially zero (or the flywheel diode 4a remains in its on state), the control circuit 16 outputs a main-device turn-on signal to the drive circuit 17 so that the drive circuit 17 changes the main switching device 3a to its on state. Accordingly, at the suitable moment between the moments t7 and t9, the main switching device 3a is turned on. In this case, the main switching device 3a implements zero-voltage switching. At a moment t8 before the moment t9 and after the moment of the change of the main switching device 3a to its on state, the current through the main switching device 3a and the flywheel diode 4a reaches substantially zero. Then, the current through the main switching device 3a increases from zero.

Operation of the resonant inverter apparatus regarding communications in each of the V and W phases is similar to the previously-mentioned operation of the resonant inverter apparatus regarding commutations in the U phase. Thus, each of the auxiliary switches 11a–11c in the resonant circuit portion 8 implements zero-current switching. Each of the main switching devices 3a–3f in the inverter portion 2 implements zero-voltage switching. Accordingly, there are substantially no switching losses.

The resonant inverter apparatus of FIG. 2 uses the three resonant capacitors 10a, 10b, and 10c while the prior-art power converter in FIG. 1 uses the six resonant capacitors. Therefore, the resonant inverter apparatus of FIG. 2 can be simpler in structure and lower in cost than the prior-art power converter in FIG. 1. In the resonant inverter apparatus of FIG. 2, the maximum voltages across the resonant capacitors 10a, 10b, and 10c are equal to a half of the voltage Vs across the DC power source 1. Thus, the rated voltage (the withstanding voltage) of the resonant capacitors 10a, 10b, and 10c can be relatively low.

Preferably, the zero voltage detection circuit 15 senses a substantially zero voltage or a low negative voltage between the collector and the emitter of each of the main switching devices 3a–3f at which a current starts to flow through related one of the flywheel diodes 4a–4f.

The inverter portion 2 may be modified into a multiple-level inverter portion such as a 3-level inverter portion in which each of upper arms and lower arms has two main switching devices.

Each of the auxiliary switches 11a–11c may include a series combination of reverse conducting switches or a parallel combination of reverse blocking switches. Preferably, the reverse conducting type switches or the reverse blocking type switches are of a self-commutated type. The reverse conducting type switches or the reverse blocking type switches of the self-commutated type include, for example, JFET's (junction field-effect transistors), MOSFET's (metal oxide semiconductor field-effect transistors), IGBT's (insulated gate bipolar transistors), IEGT's (injection enhanced insulated gate bipolar transistors), SIT's (static induction transistors), GTO's (gate turn-off thyristors), or MCT's (MOS controlled thyristors).

In view of the designing of the circuit, it is preferable that the auxiliary switches 11a–11c are of the self-commutated type (or a self-arc-extinguishing type). For example, the auxiliary switches 11a–11c include JFET's (junction field-effect transistors), MOSFET's (metal oxide semiconductor field-effect transistors), IGBT's (insulated gate bipolar transistors), IEGT's (injection enhanced insulated gate bipolar transistors), SIT's (static induction transistors), GTO's (gate turn-off thyristors), or MCT's (MOS controlled thyristors). It is preferable to select one of them according to the rated inverter output range.

Each of the auxiliary switches 11a–11c may include a series combination of reverse conducting switches or a parallel combination of reverse blocking switches. In this case, a current can flow through only one of them and a current flowing through the other can be blocked so that a conduction loss will be removed.

The reverse conducting switches are switch arrangements through which currents can flow in two directions. For example, the switch arrangements are IGBT's with which flywheel diodes are connected in antiparallel.

The reverse blocking switches are switching elements with which, for example, diodes are connected in series. The reverse blocking switches have such a rated voltage that they will not be damaged by application of voltages in two directions.

The switches of the self-commutated type or the self-arc-extinguishing type include main terminals (for example, collectors and emitters, or drains and sources), and signal terminals (for example, bases or gates). The switches of the self-commutated type or the self-arc-extinguishing type can be changed to their off states in response to a current level or a voltage level applied to the signal terminals thereof.

It is preferable that the current (the boost current) IB shown in FIG. 3 is varied in response to the level of a current flowing through the load 5, that is, the AC rotating machine for the following reason. Zero-voltage switching is implemented when the main switching device changes from its off state to its on state. To enable the zero-voltage switching, the current IB is designed so that a current greater than the load current will flow. Accordingly, it is good to set the current IB in consideration of the maximum value of the load current. The maximum value of the load current depends on the drive conditions of the load 5. Therefore, in the case where the load current differs from its maximum value, the current IB is at least partially waste so that a conduction loss occurs. Such a conduction loss can be suppressed by setting the current IB to an optimal level in response to the load current. The load current can be detected by a current sensor including, for example, a Hall-effect element. For example, values of the current IB with respect to the load current are preset as a map. The current IB is set by referring to the map in response to the result of the detection of the load current. For example, the timing of the change of the main switching device to its off state is controlled in response to the load current. In summary, the setting current IL+IB in FIG. 3 which flows through the resonant reactor is calculated from the detection result of the load current according to adding operation, and the switching timing is set in accordance therewith.

Second Embodiment

Figure 4:
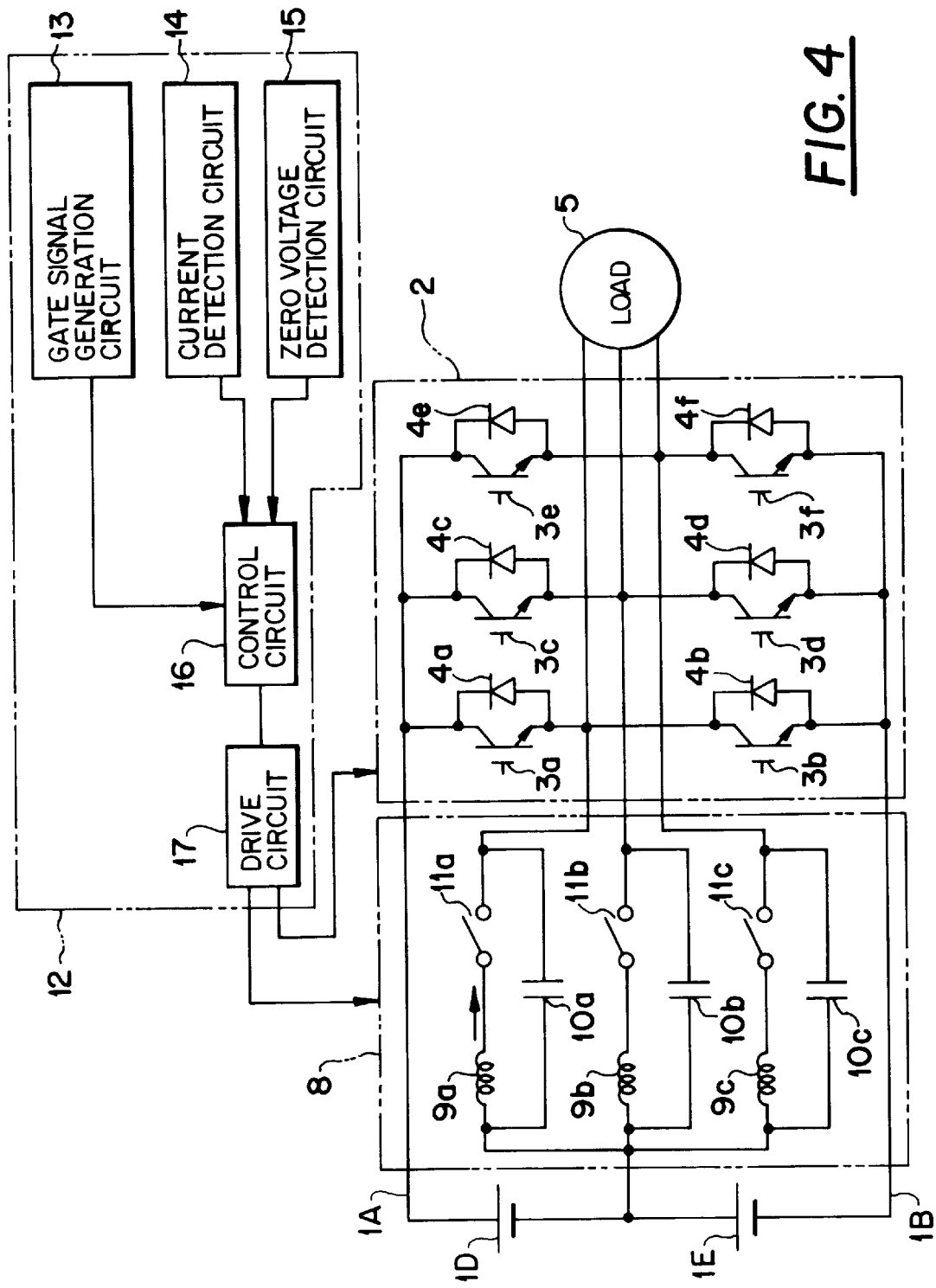
FIG. 4 is a diagram of a resonant inverter apparatus according to a second embodiment of this invention.

FIG. 4 shows a second embodiment of this invention which is similar to the first embodiment thereof except for the following design changes. As shown in FIG. 4, the second embodiment of this invention includes DC power sources 1D and 1E which replace the DC power source 1 and the voltage dividing capacitors 6 and 7 (see FIG. 2).

Preferably, the DC power sources 1D and 1E generate equal DC voltages. The positive terminal of the DC power source 1D is connected to a positive rail 1A. The negative terminal of the DC power source 1D is connected to the positive terminal of the DC power source 1E. The negative terminal of the DC power source 1E is connected to a negative rail 1B. The junction between the DC power sources 1D and 1E is connected to a resonant circuit portion 8.

It should be noted that the DC power sources 1D and 1E may be formed by a common multiple-cell battery or a common DC voltage source. In this case, a half voltage point of the common multiple-cell battery or the common DC voltage source is connected to the resonant circuit portion 8.

Third Embodiment

Figure 5:
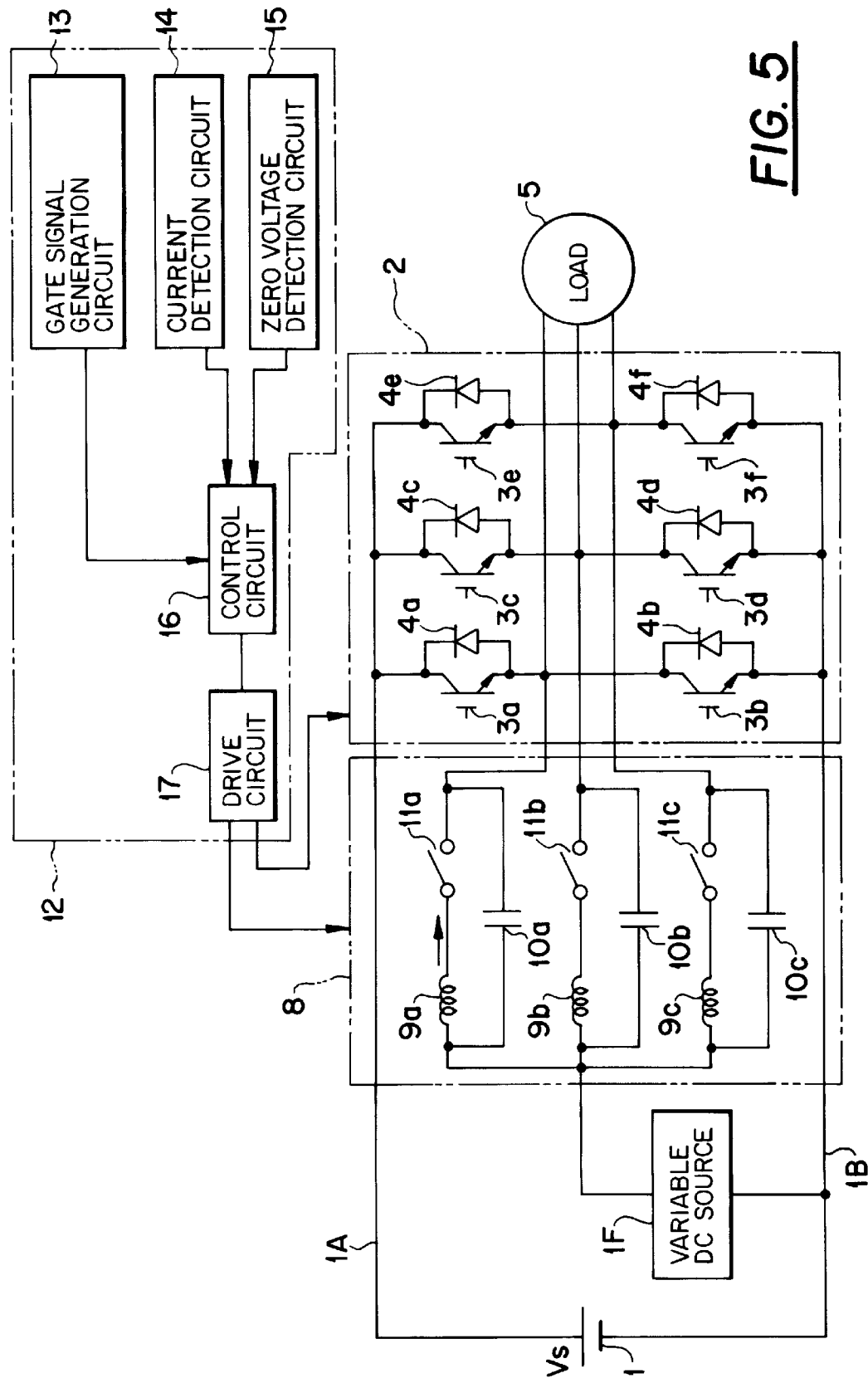
FIG. 5 is a diagram of a resonant inverter apparatus according to a third embodiment of this invention.

FIG. 5 shows a third embodiment of this invention which is similar to the first embodiment thereof except for the following design changes. As shown in FIG. 5, the third embodiment of this invention includes a DC power source 1F which replaces the voltage dividing capacitors 6 and 7 (see FIG. 2).

Preferably, the DC power source IF generates a voltage which can vary from 0 (V) to a level equal to the voltage Vs across a DC power source 1. The positive terminal of the DC power source 1F is connected to a resonant circuit portion 8. The negative terminal of the DC power source 1F is connected to a negative rail 1B.

Fourth Embodiment

Figure 6:
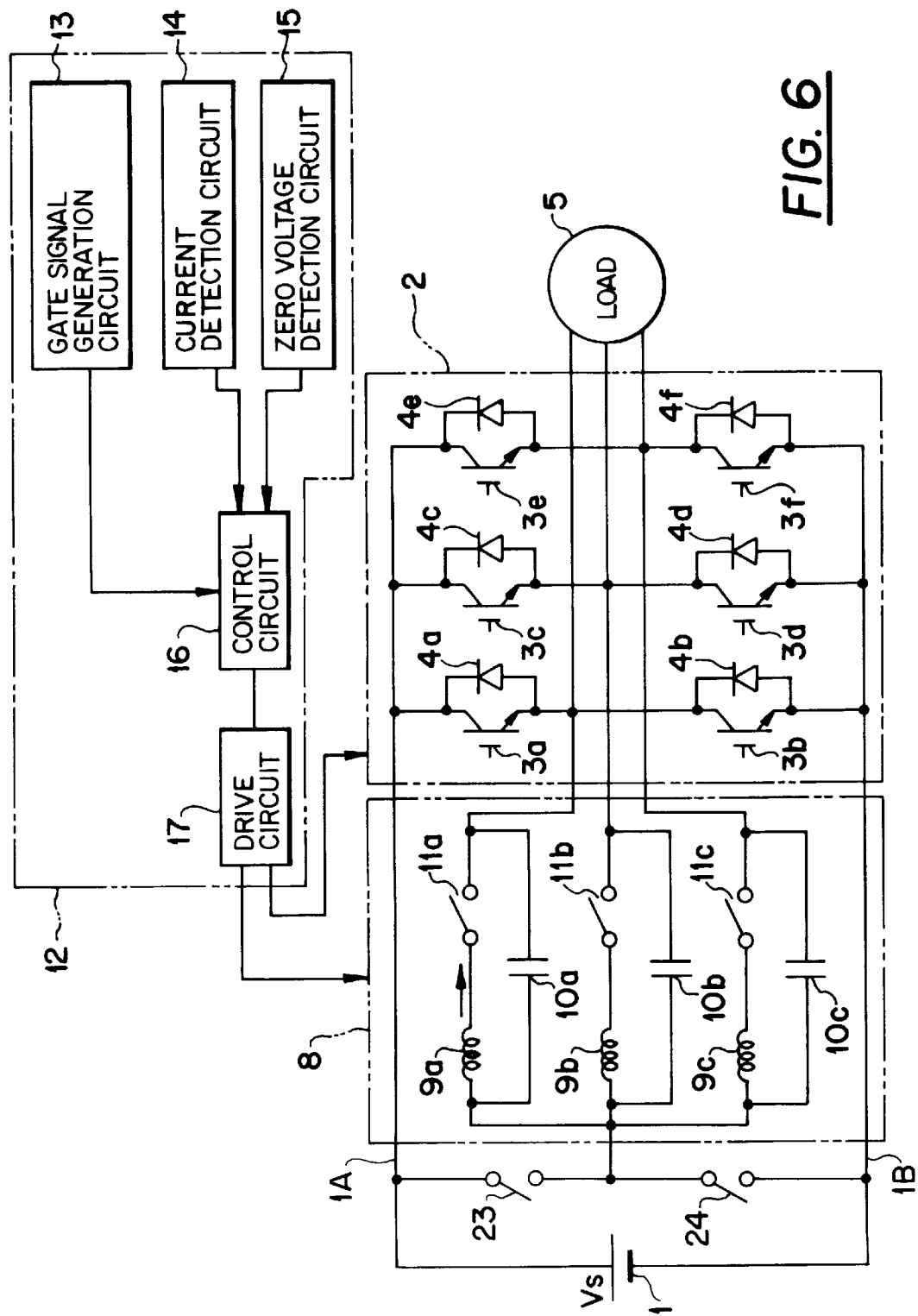
FIG. 6 is a diagram of a resonant inverter apparatus according to a fourth embodiment of this invention.

FIG. 6 shows a fourth embodiment of this invention which is similar to the first embodiment thereof except for the following design changes. As shown in FIG. 6, the fourth embodiment of this invention includes switches 23 and 24 which replace the voltage dividing capacitors 6 and 7 (see FIG. 2).

A first terminal of the switch 23 is connected to a positive rail 1A. A second terminal of the switch 23 is connected to a first terminal of the switch 24. A second terminal of the switch 24 is connected to a negative rail 1B. The junction between the switches 23 and 24 is connected to a resonant circuit portion 8.

Operation of the switches 23 and 24 for one phase is as follows. In the case where an initial current through a resonant reactor 9a is zero and then a leftward current is intended to flow, the switch 23 is set in its off state and the switch 24 is set in its on state so that a current can linearly vary at an increased rate (an increased slope). Thus, high-speed switching can be implemented. When resonance terminates and the leftward current through the reactor 9a is intended to decrease to zero, the switch 23 is set in its on state and the switch 24 is set in its off state.

On the other hand, in the case where the initial current through the resonant reactor 9a is zero and then a rightward current is intended to flow, the switch 23 is set in its on state and the switch 24 is set in its off state. When resonance terminates and the rightward current through the reactor 9a is intended to decrease to zero, the switch 23 is set in its off state and the switch 24 is set in its on state.

These processes change a voltage applied to the resonant reactor 9a. The voltage change can increase a rate or a slope at which a current linearly varies with respect to time. Thus, it is possible to shorten a time or a duration of switching.

Fifth Embodiment

Figure 7:
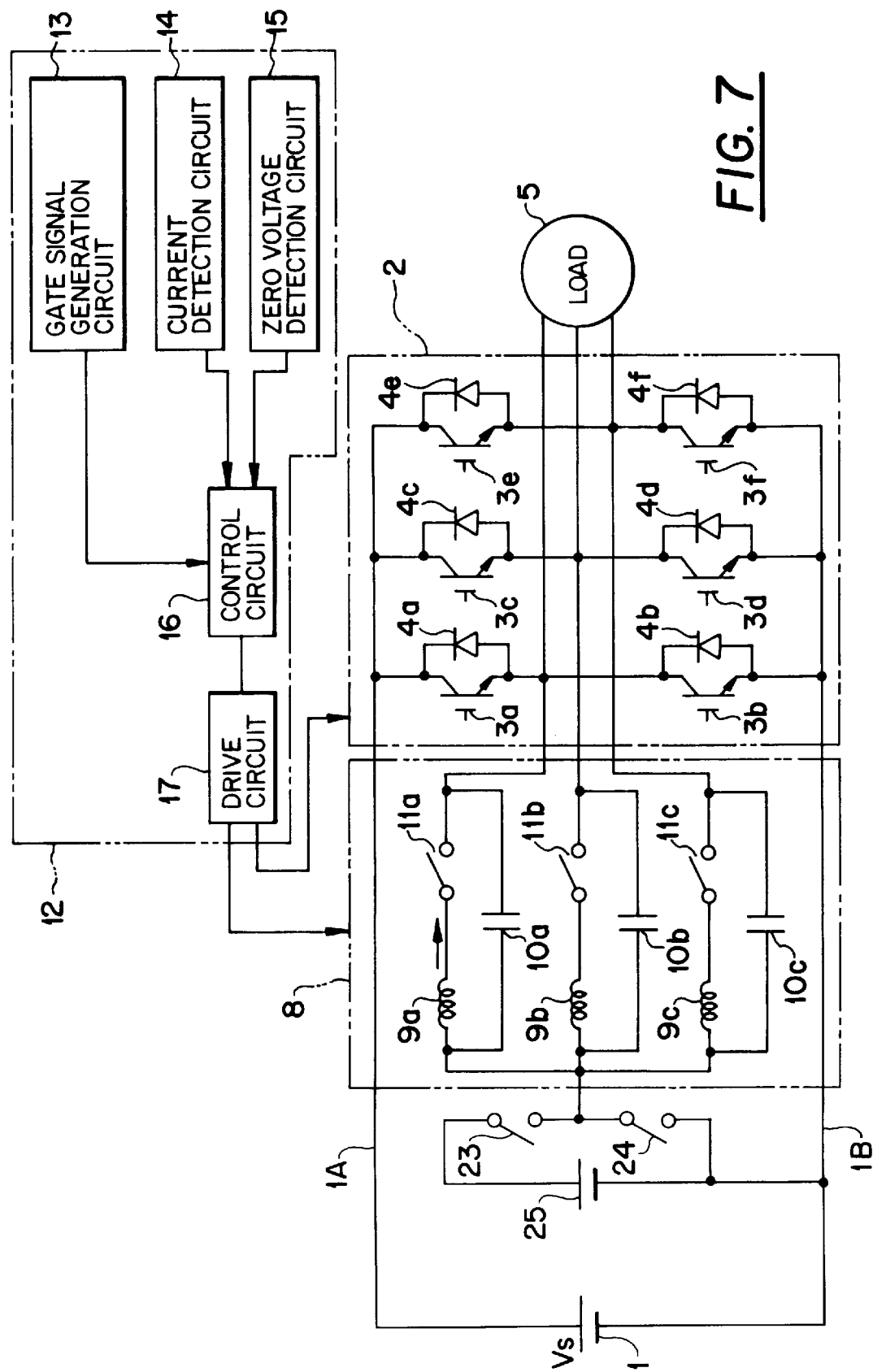
FIG. 7 is a diagram of a resonant inverter apparatus according to a fifth embodiment of this invention.

FIG. 7 shows a fifth embodiment of this invention which is similar to the fourth embodiment thereof except for the following design changes. As shown in FIG. 7, the fifth embodiment of this invention includes a DC voltage source 25.

A first terminal of a switch 23 is connected to a positive terminal of the DC voltage source 25. A second terminal of the switch 23 is connected to a first terminal of a switch 24. A second terminal of the switch 24 is connected to a negative terminal of the DC voltage source 25. The junction between the switches 23 and 24 is connected to a resonant circuit portion 8. The negative terminal of the DC voltage source 25 is connected to a negative rail 1B.

What is claimed is:

1. A resonant inverter apparatus comprising:
   a DC voltage source for generating a DC voltage;
   an inverter portion connected to the positive and negative rails of the DC voltage source, the inverter portion including upper main switches and lower main switches being series-coupled in each phase, main switching devices provided in the upper and lower main switches respectively, and flywheel diodes connected in antiparallel with the main switching devices respectively;
   bus-splitting means connected to the positive and negative rails of the DC voltage source, or a variable DC source connected to the negative rail of the DC voltage source;
   a resonant circuit portion connected to the junction of a pair of series-coupled bus splitting means or the other terminal of a variable DC source and the inverter portion, the resonant circuit portion including resonant reactors, auxiliary switches, and resonant capacitors, the resonant reactors and the auxiliary switches being connected in series circuits, the series circuits being connected between the junction of a pair of series-coupled bus splitting means and the junctions of the respective phases in the inverter portion, the resonant capacitors being connected in parallel with the series circuits respectively;
   current detection means for detecting currents flowing through the resonant reactors; and
   gate drive means for turning on an auxiliary switch, which is in the series circuit connected to the junction between series-coupled main switches of a phase to be switched, among the auxiliary switches to cause resonance by the related resonant reactor and the related resonant capacitor, for enabling main switching devices, which are of the phase to be switched, among the main switching devices to implement zero-voltage switching, and for turning off the auxiliary switch in the series circuit connected to the junction between series-coupled main switches of the phase to be switched when the current flowing through the related resonant reactor which is detected by the current detection means becomes substantially zero.

2. A resonant inverter apparatus as recited in claim 1, wherein the gate drive means comprises a gate signal generation circuit for generating and outputting a signal representative of a pattern for controlling the main switching devices, a zero voltage detection circuit for detecting that voltages across the main switching devices become substantially zero, and outputting a signal representative thereof, a control circuit generating and outputting a signal representative of a switching pattern for the main switching devices and the auxiliary switches in response to the signals outputted from the gate signal generation circuit and the zero voltage detection circuit and an output signal of the current detection means, and a drive circuit for driving the main switching devices and the auxiliary switches in response to the signal outputted from the control circuit.

3. A resonant inverter apparatus as recited in claim 1, wherein the bus-splitting means comprise a series combination of capacitors.

4. A resonant inverter apparatus as recited in claim 1, wherein the bus-splitting means comprise a series combination of DC power sources.

5. A resonant inverter apparatus as recited in claim 1, wherein each of the auxiliary switches includes a series combination of reverse conducting type switches or a parallel combination of reverse blocking type switches.

6. A resonant inverter apparatus as recited in claim 1, wherein each of the auxiliary switches is of a self-commutated type.

7. A resonant inverter apparatus as recited in claim 1, wherein each of the auxiliary switches includes one of a junction field-effect transistor, a metal oxide semiconductor field-effect transistor, an insulated gate bipolar transistor, an injection enhanced insulation gate bipolar transistor, a static induction transistor, a gate turn-off thyristor, and a MOS controlled thyristor.

8. A resonant inverter apparatus as recited in claim 1, wherein the gate drive means includes means for turning off the main switching device of the phase to be switched when the related auxiliary switch is in its on state and the current flowing through the related resonant reactor which is detected by the current detection means reaches a reference current level.

9. A resonant inverter apparatus as recited in claim 1, wherein the reference current level varies as a function of a load current fed from the inverter portion to a load.

10. A resonant inverter apparatus as recited in claim 1, wherein the gate drive means includes means for turning on the main switching device of the phase to be switched during a time interval for which the related flywheel diode connected in antiparallel with the main switching devices is in its conductive state.

11. A resonant inverter apparatus as recited in claim 1, wherein the detection means includes Hall-effect current sensors for detecting the currents flowing through the resonant reactors.

12. A resonant inverter apparatus as recited in claim 1, wherein the detection means includes current sensors incorporated in the auxiliary switches for detecting the currents flowing through the resonant reactors.

13. A resonant inverter apparatus as recited in claim 1, wherein the resonant capacitor of the phase to be switched operate as a snubber for the main switching device in the related upper and lower main switches when the main switching device is turned off.

14. A resonant power converter apparatus comprising:
   a positive rail and a negative rail connected to a DC voltage source;
   a power conversion circuit portion provided between the positive rail and the negative rail, the power conversion circuit portion including main switching devices forming upper and lower arms of different phases respectively, and flywheel diodes connected in antiparallel with the main switching devices respectively, the power conversion circuit portion performing power conversion for converting a DC voltage of the DC voltage source into an AC voltage;
   a voltage output circuit portion outputting a given voltage equal to or lower than a voltage applied between the positive rail and the negative rail;
   a resonant circuit portion including series connection circuits connected between the voltage output circuit portion and junctions between the upper and lower arms of the different phases respectively, the series connection circuits including resonant reactors and auxiliary switches, the resonant circuit portion including resonant capacitors connected in parallel with the series connection circuits respectively; and
   a controller for turning on the auxiliary switch of the series connection circuit connected to the junction between the upper and lower arms of the phase to be switched to cause the related resonant reactor and the related resonant capacitor to make resonance, for zero-voltage-switching the main switching devices of the phase to be switched, and for turning off said turned-on auxiliary switch when detecting that a current flowing through said resonant reactor becomes zero.

15. A resonant power converter apparatus as recited in claim 14, wherein the voltage output circuit portion includes a variable voltage output portion which can vary an output voltage in a range of the voltage applied between the positive rail and the negative rail.

16. A resonant power converter apparatus as recited in claim 15, wherein the variable voltage output portion includes first and second switches connected in series between the positive rail and the negative rail, wherein a voltage at a junction between the first and second switches is applied to the resonant reactors.

17. A resonant power converter apparatus as recited in claim 14, wherein the voltage output circuit portion includes first and second switches connected across a second DC voltage source different from the DC voltage source which applies a voltage between the positive rail and the negative rail, wherein a voltage at a junction between the first and second switches is applied to the resonant reactors.

18. A resonant power converter apparatus as recited in claim 14, wherein the voltage output circuit portion includes means for outputting a voltage at a mid point in the DC voltage source which applies a voltage between the positive rail and the negative rail.

19. A resonant power converter apparatus as recited in claim 14, wherein the controller comprises:
   a gate signal generation circuit for generating a pattern for controlling gates of the main switching devices;
   a current detection circuit for detecting currents of the resonant reactors;
   a zero voltage detection circuit for detecting zero voltages of the main switching devices;
   a control circuit receiving output signals from the gate signal generation circuit, the current detection circuit, and the zero voltage detection circuit, and outputting a switching pattern of the main switching devices; and
   a drive circuit for converting the switching pattern into voltages which can drive the main switching devices.

20. A resonant power converter apparatus as recited in claim 14, wherein each of the auxiliary switches includes a series combination of reverse conducting type switches or a parallel combination of reverse blocking type switches.

21. A resonant power converter apparatus as recited in claim 20, wherein each of the auxiliary switches is of a self-commutated type.

22. A resonant power converter apparatus as recited in claim 21, wherein each of the auxiliary switches includes one of a JFET, a MOSFET, an IGBT, an IEGT, a SIT, a GTO, and an MCT.

23. A resonant power converter apparatus as recited in claim 14, wherein the controller comprises means for turning off the main switching device of the phase to be switched when detecting that the related auxiliary switch is in its on state and a given current value flows through the related resonant reactor.

24. A resonant power converter apparatus as recited in claim 23, wherein the given current value varies in response to a magnitude of a load current.

25. A resonant power converter apparatus as recited in claim 14, wherein the controller comprises means for turning on the main switching device of the phase to be switched during a time interval for which the related flywheel diode connected in antiparallel with said main switching device is in its conductive state.

26. A resonant power converter apparatus as recited in claim 14, wherein currents flowing through the resonant reactors are detected by Hall-effect current sensors.

27. A resonant power converter apparatus as recited in claim 14, wherein currents flowing through the resonant reactors are detected by current sensors incorporated in the auxiliary switches.

* * * * *